Oct. 6, 1959 B. H. SHORT Re. 24,715
VEHICLE ELECTRICAL SYSTEM
Original Filed Jan. 16, 1956
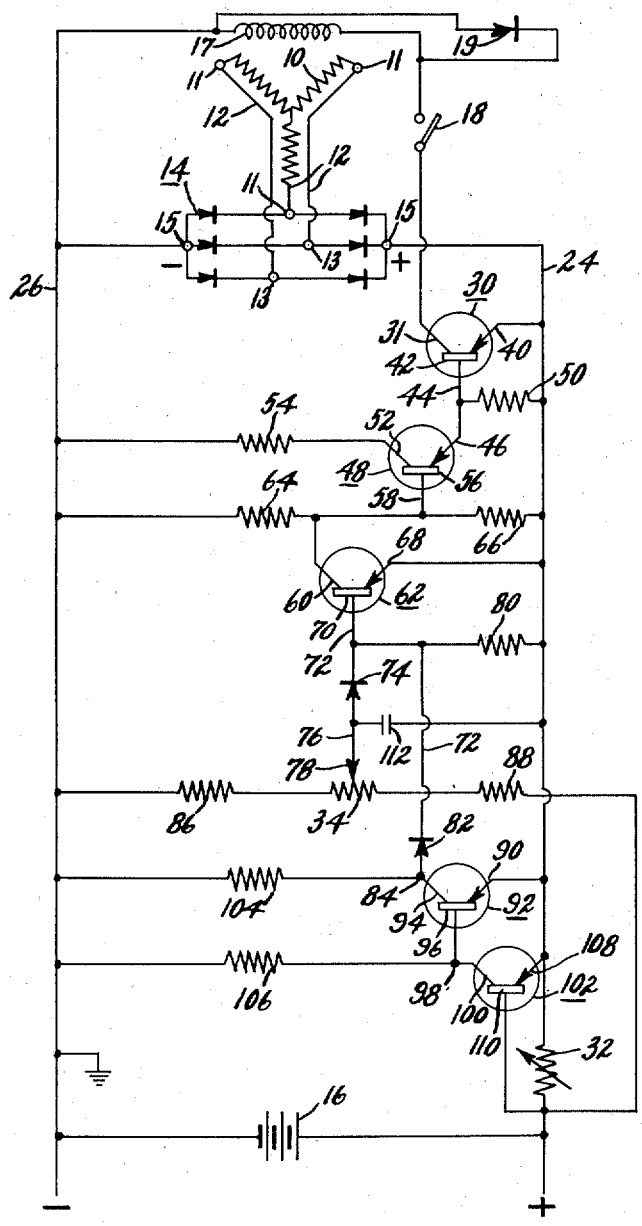
INVENTOR.
BROOKS H. SHORT
BY John A. Marsin
HIS ATTORNEY United States Patent Office Re. 24,715
Reissued Oct. 6, 1959

24,715

VEHICLE ELECTRICAL SYSTEM

Brooks H. Short, Anderson, Ind., assignor to General Motors Corporation, Detroit, Mich., a corporation of Delaware Original No. 2,809,301, dated October 8, 1957, Serial No. 559,189, January 16, 1956. Application for reissue May 1, 1959, Serial No. 810,518

8 Claims. (Cl. 290—50)

Matter enclosed in heavy brackets [ ] appears in the original patent but forms no part of this reissue specification; matter printed in italics indicates the additions made by reissue.

This invention relates to electrical systems for motor vehicles and is more particularly concerned with certain improvements in battery charging systems of the type wherein the battery which is connected with a D.C. load circuit is charged by a dynamoelectric unit whose speed varies greatly and which is driven by the prime mover of the motor vehicle.

The advantages of a battery charging system in a motor vehicle which includes an alternator as a source of charging current and voltage are widely accepted for, when an alternator is used, a considerably higher output current and voltage can be obtained when the vehicle is operated at idling speeds. These systems usually are provided with a rectifier which changes the alternating output current of the alternator to direct current to supply the various electrical devices in the motor vehicle with D.C. current and to charge the storage battery. Also included in these systems are a plurality of mechanical relays which are arranged to maintain the output of the alternator substantially constant regardless of the speed of the vehicle engine and to prevent the discharge of the battery through the alternator circuit network when the vehicle engine is at rest.

One of the objects of the present invention is to provide a battery charging system in a motor vehicle in which a considerably increased output of electrical energy is obtained for lower engine speeds than has heretofore been possible and to control this output with a device which has no mechanical moving parts such as relays which are normally used to control the charging of the battery charging circuit.

It is another object, therefore, of the present invention to provide an alternating current battery charging system in a motor vehicle with a silicon power rectifier which changes the alternating current output of the alternator to direct current for battery charging and other purposes and prevents the flow of current from the battery through said alternator when the vehicle engine is at rest.

A further object of the present invention is to provide a regulating system for an alternator wherein a transistor is used to control the energization of the alternator field windings in response to the output of a silicon rectifier which changes the output of the alternator from A.C. to D.C. current for battery charging and other purposes and prevents the discharge of said battery through said alternator during periods when the vehicle engine which drives the alternator is at rest.

A still further object of the present invention is to eliminate the use of a cutout relay in a battery charging system that includes an alternator whose output is controlled by a transistor voltage regulator by utilizing the blocking effect of a silicon rectifier to eliminate the flow of current from the battery to the alternator when the alternator is at rest.

Further objects and advantages of the present invention will be apparent from the following description, reference being had to the accompanying drawing wherein a preferred embodiment of the present invention is clearly shown.

In the drawings:

The single figure shown diagrammatically illustrates a wiring diagram of a motor vehicle battery charging system according to the present invention.

In the present day battery charging systems as used in motor vehicles, a direct current generator is usually employed to supply the necessary current and voltage for battery charging and other electrical loads. These direct current generators have their fields controlled by vibrating relays which are circuited to vary the energization of the field to maintain the generator output substantially constant and within limits which will not prove harmful to the electrical components of the system or to the battery. While systems of this type have enjoyed commercial acceptance, certain objectionable characteristics have been noted as when the contacts of the control relays become welded together or the calibration of the relays is upset to cause injury to the battery or generator. These systems have further been found objectionable under certain conditions because of their inherent low electrical output at idling speeds. To overcome the latter objection, it has been proposed to replace the direct current generator with an alternator. In commercial systems of this type, the output of the alternator is generally rectified to direct current by a rectifier and the output of the rectifier, in turn, is connected through a cutout relay with the battery. The cutout relay, in turn, is controlled by an external means arranged so the relay will be closed only when the alternator is being rotated sufficiently to provide a battery charging current. If this arrangement is not used, it has been found that during periods when the circuit between the rectifier and battery is opened and the output of the alternator is still relatively high, the high transient voltages which are set up by the rapid collapse of the alternator field will cause severe injury to the rectifier.

The present invention is directed to a battery charging system wherein the above objectionable features have been eliminated. This is accomplished by changing the output of the alternator in a silicon rectifier and controlling this output by a transistor network circuit. This arrangement will eliminate all of the relays which have been heretofore used and will utilize the blocking effect of the silicon rectifier to prevent discharge of the battery during periods when the motor vehicle is idle for an appreciable length of time.

The use of a silicon rectifier in the above system possesses considerable advantages over other rectifiers as heretofore employed as it has been found that the silicon rectifier has only a .4 to 1 volt drop when the rectifier is conducting in the forward direction against a 2.4 volts drop when other rectifiers, i.e., a selenium rectifier is used. Further, in the reverse direction, the silicon rectifier will withstand about ten times the voltage across its terminal as will the selenium rectifier. These advantages together with the fact that the silicon rectifier will be conductive in the microamp range in the reverse direction whereas the other type of rectifiers such as the selenium rectifiers heretofore used are conductive in the high milliamp range makes possible the use of a single rectifier in the type of battery charging system herein contemplated so as to eliminate the requirement for a mechanical relay and additional rectifiers which have been heretofore employed.

In the drawing, the alternator or A.C. generator 10, which is shown, may be of any suitable conventional types such as a Y or delta connected unit which is suitable for use in motor vehicles. The alternator 10 is provided with output terminals 11 which are connected through leads 12 with the input terminals 13 of the silicon rectifier 14. The output terminals 15 of the rectifier 14 are connected through leads 24 and 26 to the battery 16 and to other electrical loads, not shown. The alternator 10 has its field 17 controlled by a means which will be hereinafter described and which are similar to the control set forth in application, S.N. 546,503, filed November 14, 1955, which has been assigned by the inventors to the assignee of the present invention.

In the drawing, it will be seen that the variable resistance 32 is connected between the output terminal 15 of the rectifier 14 and the battery 16. The field winding 17 of the alternator 10 has one end connected directly to lead 26 and the opposite end connected through a suitable switch 18 to the collector electrode 31 of transistor 30. The switch 18 may be the ignition switch of the prime mover if desired. The emitter electrode 40 of transistor 30 is connected to lead 24 which, in turn, is connected to the positive output terminals 15 of the silicon rectifier 14. The base 42 of transistor 30 is connected directly through a lead 44 to the emitter electrode 46 of a transistor 48. A resistance 50 is connected between leads 44 and 24. The collector electrode 52 of transistor 48 is connected through a resistance 54 with lead 26 and the base 56 of transistor 48 is connected through a lead 58 with a collector electrode 60 of a transistor 62. The lead 58 has one end connected through a resistance 64 to lead 26 and the other end connected through a resistance 66 with lead 24. The emitter electrode 68 of transistor 62 is connected directly to lead 24 and the base 70 is connected through a lead 72, a rectifying diode 74 and a lead 76 to a variable tap 78 on a variable resistance 34. A resistance 80 is connected between the lead 72 and lead 24 and a second rectifying diode 82 is connected between a junction 84 and lead 72. The variable resistance 34 has one end connected through a resistance 86 with lead 26 and the other end connected through a resistance 88 with lead 24 on the battery side of resistance 32. The emitter electrode 90 of the transistor 92 is directly connected to lead 24 and the collector electrode 94 of transistor 92 is connected with junction 84. The base 96 of the transistor 92 is connected through a junction 98 with the collector electrode 100 of a transistor 102. The resistances 104 and 106 each have one end respectively connected with junctions 84 and 98 and the other ends connected with lead 26. The transistor 102 has its emitter electrode 108 connected to the rectifier 14 side of the variable resistance 32 and the base 110 connected to the battery 16 side of the variable resistance 32. The condenser 112 is connected between leads 76 and 24 and is included to render the regulator means responsive to the average direct current output of the rectifier.

The diode rectifiers 74 and 82 are of the type known as Zener diodes which break down upon the application of a higher voltage than that for which they are designed so that current may flow through them in the reverse direction when the voltage exceeds a predetermined value. However, upon restoring the normal voltage or less thereacross they recover their rectifying or blocking action without damage.

In operation, the current and voltage regulating system will function as follows to control the flow of current through the field 17 to the alternator 10. When the alternator 10 is producing an A.C. output current and voltage through the rectifier 14 sufficient to charge the battery 16, current will flow through the resistance 32. When current flows through resistance 32, the base of the transistor 102 will become negative with respect to the emitter and cause the current through resistance 106 to be shifted from the base circuit of transistor 92 to the collector circuit of transistor 102. As this shift occurs, the base current in transistor 92 is reduced. Since the collector current in a transistor is a function of the base current, and as the base current in transistor 92 is decreased; it therefore follows that the collector current in transistor 92 will be decreased and the current from collector of transistor 92 through resistance 104 is decreased. This means that as the current in the resistance 32 is increased, the current in resistance 104 is decreased. Such a decrease in current in resistance 104 results in a lower voltage drop in the resistance 104 thereby moving the potential of junction 84 closer to the negative side with an increase in current in resistance 32.

When the potential between lead 24 and junction 84 exceeds the Zener curve value of the diode 82, the diode 82 will permit current to pass through the resistance 80 to cause the base 70 of transistor 62 to become conductive. When the transistor 62 is conductive, it will control the action of transistors 30 and 48, as will be hereinafter described, to vary the current flow through field 17 to regulate the output of alternator 10 in response to the current flowing through the variable resistance 32.

The control of the base current of transistor 62 is determined by the flow of current through the Zener diodes 82 or 74. When these diodes 82 or 74 are non-conductive, no current will pass through the base circuit of transistor 62. The Zener diode 82 is rendered conductive in response to current flow through resistance 32 as heretofore set forth. When the voltage output of alternator 10 exceeds a predetermined value, as determined by the setting of tap 78, the potential imposed across Zener diode 74 will exceed its Zener curve value and diode 74 will be conductive. The setting of tap 78 on resistance 34 will determine the conductivity of diode 74. The greater the value of the resistance 34, as is determined by the location of tap 78, that is added to resistance 88, then the greater is the percentage of the voltage between leads 24 and 26 that will be imposed across diode 74, so when a predetermined voltage is impressed across diode 74, a lower output voltage of alternator 10 will occur.

The transistor 48 is included in the circuit to increase the overall gain without accompanying phase reversal. As is evident in the circuit hook-ups of the transistors heretofore discussed, an increase of current in one stage results in a reversal or decrease in current in the next transistor. In order to obtain a sufficient amplification in the voltage device, a three-stage transistor amplifier is desirable. By using the circuit shown, the transistors 30 and 48 work in the same direction and do not reverse the phase. When the Zener diode 74 or 82 is made conductive, the base circuit of transistor 62 will be made conductive and the collector circuit of transistor 62 will pass current through resistance 64. This will cause the base current in transistor 48 to decrease. The current in the collector of transistor 48 is equal to beta times the change in the base current. Thus, the current flowing through the emitter of transistor 48 is equal to (beta plus 1) times the change in the base current of transistor 48 which will flow through either resistance 50 or through the base and emitter of transistor 30. The base to emitter resistance of transistor 30 is relatively small compared to the resistance value of resistance 50. For that reason, the change in current of (beta plus 1) times the base current of transistor 48 is available to use as base current in transistor 30. As the base current in transistor 30 is decreased by this amount, the field 17 current, which is the collector current of transistor 30, is greatly reduced.

From the above, it is apparent that the variable resistance 32, the transistors 102, 92, the current limiting resistances 104 and 106 and the Zener diode 82 are used to control the energization of the field through the transistor network which includes transistor 30 in response to the current which flows through the resistance 32.

A rectifier 19 is placed in parallel with the field 17 to absorb transients that may otherwise damage the transistor 30.

While the embodiment of the present invention as herein disclosed, constitutes a preferred form, it is to be understood that other forms might be adopted.

What is claimed is as follows:

1. In an electrical system for a motor vehicle having a variable speed driving engine and a direct current load including a storage battery, the combination comprising; an alternator having load terminals and an exciting field winding, torque transmitting means connecting said alternator with said driving engine to be driven thereby, a silicon rectifier having input terminals connected with the load terminals of said alternator and output terminals connected with said direct current load, and a transistor regulating means connected in circuit with said exciting field winding and the output terminals of said rectifier and operable by the rectified voltage of said rectifier for regulating the excitation of said field winding.

2. In an electrical system for a motor vehicle having a variable speed driving engine and a D.C. load including a storage battery, the combination comprising; an alternator having load terminals and an exciting field arranged to vary the current and voltage output of said alternator, a silicon rectifier having input terminals connected to said load terminals and output terminals connected with said D.C. load for supplying D.C. voltage and current to said D.C. load whenever the voltage output of said alternator exceeds the potential of said battery, and a means connected to the output terminals of said rectifier and field for varying current in said field in response to variations in voltage at the output terminals of said rectifier, said means including a transistor and a means connected in circuit with said transistor and output terminals of said rectifier.

3. In a motor vehicle having a variable speed driving engine, an electrical system comprising in combination; an alternator driven by said engine and having an exciting field winding and load terminals, a D.C. load including a storage battery, a silicon power rectifier having input load terminals connected in circuit with the output terminals of said alternator and output terminals directly connected with the D.C. load for supplying rectified current from said alternator directly to said battery whenever the voltage across said output terminals exceeds the voltage of said battery, and a transistor means connected between the output terminals of said rectifier and said field winding for varying the excitation of said field in response to the potential of said output terminals.

4. In a motor vehicle having a variable speed driving engine, an electrical system comprising in combination; an alternator driven by said engine and having an exciting field winding and load terminals, a D.C. load including a storage battery, a silicon power rectifier having input load terminals connected in circuit with the output terminals of said alternator and output terminals directly connected with the D.C. load for supplying rectified current from said alternator directly to said battery whenever the voltage across said output terminals exceeds the voltage of said battery, and a means including a transistor network connected between the output terminals of said rectifier and said field winding for selectively varying the excitation of said field in response to the current flow and the potential present at said output terminals.

5. In a motor vehicle having a variable speed driving engine, an electrical system comprising in combination; an alternator driven by said engine and having an exciting field winding and load terminals, a D.C. load including a storage battery, a silicon power rectifier having input load terminals connected in circuit with the output terminals of said alternator and output terminals directly connected with the D.C. load for supplying rectified current from said alternator directly to said battery whenever the voltage across said output terminals exceeds the voltage of said battery, and a means including a Zener diode and a transistor connected between the output terminals of said rectifier and said field winding for varying the excitation of said field in response to the potential of said output terminals.

6. In a motor vehicle having a variable speed driving engine, an electrical system comprising in combination; an alternator driven by said engine and having an exciting field winding and load terminals, a D.C. load including a storage battery, a silicon power rectifier having input load terminals connected in circuit with the output terminals of said alternator and output terminals directly connected with the D.C. load for supplying rectified current from said alternator directly to said battery whenever the voltage across said output terminals exceeds the voltage of said battery, and transistor means connected to the output terminals of said silicon rectifier and to said field to control the flow of current through the field in response to the voltage across said output terminals.

7. In an electrical system for a motor vehicle having a direct current load circuit including a storage battery, a variable source of electric current and voltage connected in circuit with said D.C. load for supplying current and voltage to said load and charging said battery when the voltage at said source exceeds the battery voltage, a silicon rectifier connected in said circuit between said source and battery for preventing the flow of current from said battery to said source and a regulating means including a transistor having a base and emitter connected to said circuit between said silicon rectifier and battery and a collector connected in circuit with said source for maintaining the voltage of said source substantially constant.

*8. In an electrical system for a motor vehicle having a direct current load circuit including a storage battery, a variable source of electric current and voltage connected in circuit with said D.C. load for supplying current and voltage to said load and charging said battery when the voltage at said source exceeds the battery voltage, a p–n junction semiconductor rectifier connected in said circuit between said source and battery for preventing the flow of current from said battery to said source and a regulating means including a transistor having a base and emitter connected to said circuit between said rectifier and battery and a collector connected in circuit with said source for maintaining the voltage of said source substantially constant.*

References Cited in the file of this patent or the original patent

UNITED STATES PATENTS

| | | |
|---|---|---|
| 2,117,141 | Breer et al. | May 10, 1938 |
| 2,494,749 | Fagen et al. | Jan. 17, 1950 |
| 2,557,298 | Leece et al. | June 19, 1951 |
| 2,558,644 | Claytor | June 26, 1951 |
| 2,740,086 | Evans et al. | Mar. 27, 1956 |
| 2,751,549 | Chase | June 19, 1956 |
| 2,751,550 | Chase | June 19, 1956 |
| 2,759,142 | Hamilton | Aug. 14, 1956 |